INVENTOR.
Harold Hemming.
BY Robert J. Palmer
Attorney

Jan. 31, 1950     H. HEMMING     2,496,209
VENTILATING SYSTEM FOR OVERHEAD CRANE CABS
Filed March 29, 1946     2 Sheets-Sheet 2

INVENTOR.
Harold Hemming.
BY Robert T. Palmer
Attorney

Patented Jan. 31, 1950

2,496,209

UNITED STATES PATENT OFFICE 2,496,209

VENTILATING SYSTEM FOR OVERHEAD CRANE CABS

Harold Hemming, Dedham, Mass., assignor, by mesne assignments, to Westinghouse Electric Corporation, a corporation of Pennsylvania Application March 29, 1946, Serial No. 658,346

4 Claims. (Cl. 98—39)

This invention relates to ventilating and air conditioning systems for movable enclosures, and relates more particularly to ventilating and air conditioning systems for the cabs of overhead cranes.

The cabs of overhead cranes in foundries, travel above moulds and furnaces which not only add heat to, but add fumes and smoke to the air to which the operators of the cranes are exposed. For providing comfortable conditions for the operators it has been proposed to mount in each cab an air cooling system utilizing mechanical refrigeration. While such equipment could cool the air satisfactorily, it could not clean the contaminated air effectively, and the cost of operating such equipment would be excessive due to the high temperatures to which the condensers would be exposed.

This invention provides a ventilating and air conditioning system for the cab of an overhead crane, in which the air cooling and cleaning equipment and the ventilating fan, is located external the cab in a location providing clean air, the clean cool air being supplied to the cab through a stationary duct which connects through an air seal with a movable duct carried by the crane cab.

An object of the invention is to supply conditioned air from a remote location to a movable enclosure.

A more definite object of the invention is to supply conditioned air to the cab of an overhead crane, from equipment handling relatively clean air, and located external the cab.

The invention will now be described with reference to the drawing, of which:

Figure 1:
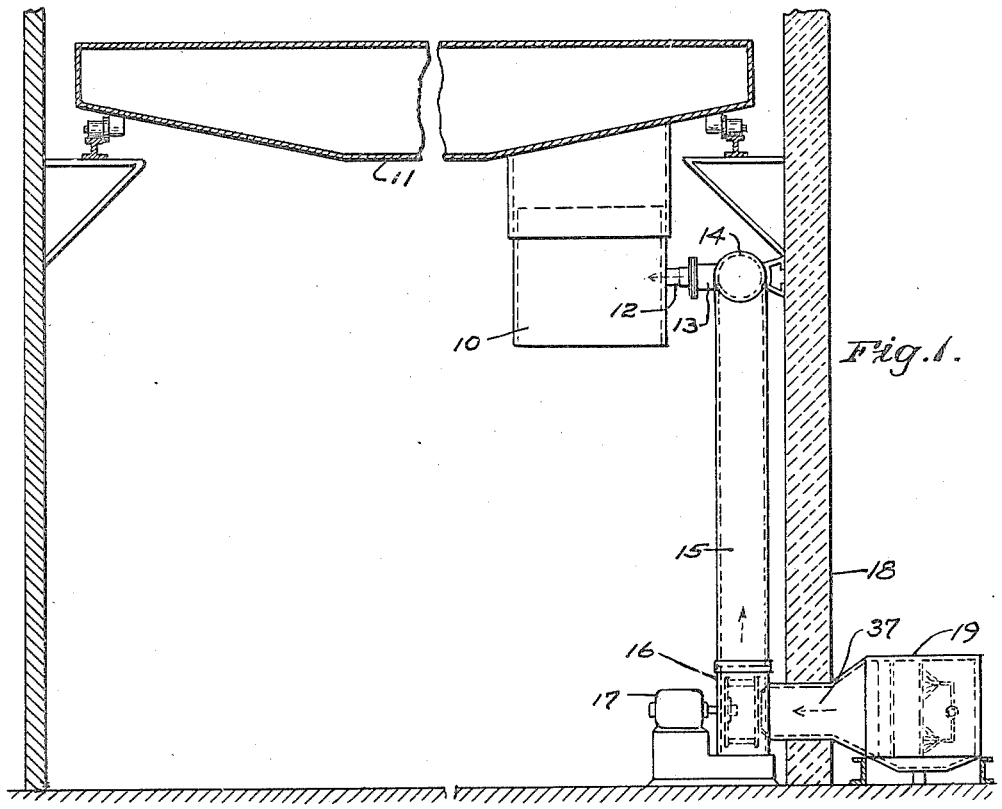
Fig. 1 is a side elevation of an overhead crane cab equipped with an air conditioning system embodying this invention.

The cab 10 is the conventional operator's cab of an overhead crane 11. The duct 12 is attached to the cab 10 so as to be movable therewith, and has one end connected into the interior of the cab for supplying air thereinto. The other end of the duct 12 is connected with the interior of the extension 13 of the horizontally extending duct 14.

The duct 14 is connected by the vertically extending duct 15 with the outlet of the centrifugal fan 16 which is driven by the electric motor 17. The inlet of the fan is connected by the duct 37 extending through the wall 18 of the building, with the outlet of the air washer 19 having an inlet for outdoor air.

In operation, the fan 16 draws outdoor air through the water spray in the air washer 19, and supplies it through the ducts 15, 14 and 12 into the crane cab. In most locations the spray water can be recirculated providing evaporative cooling. In locations having such high wet bulb temperatures in the outdoor air that evaporative cooling is not effective, the spray water can be cooled by ice or other forms of refrigeration.

The air washer acts to wash and clean as well as to cool the air supplied to the cab.

Figure 2:
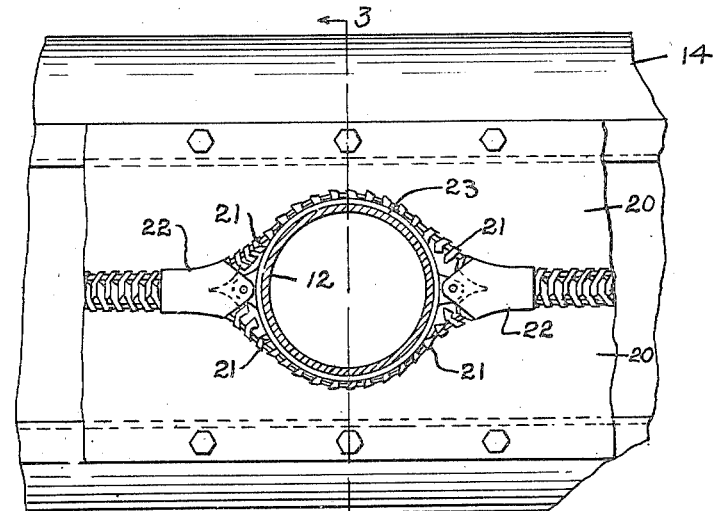
Fig. 2 is a sectional view along the lines 2—2 of Fig. 3, and illustrates one form of movable seal for connecting the movable and stationary ducts of Fig. 1.
Figure 3:
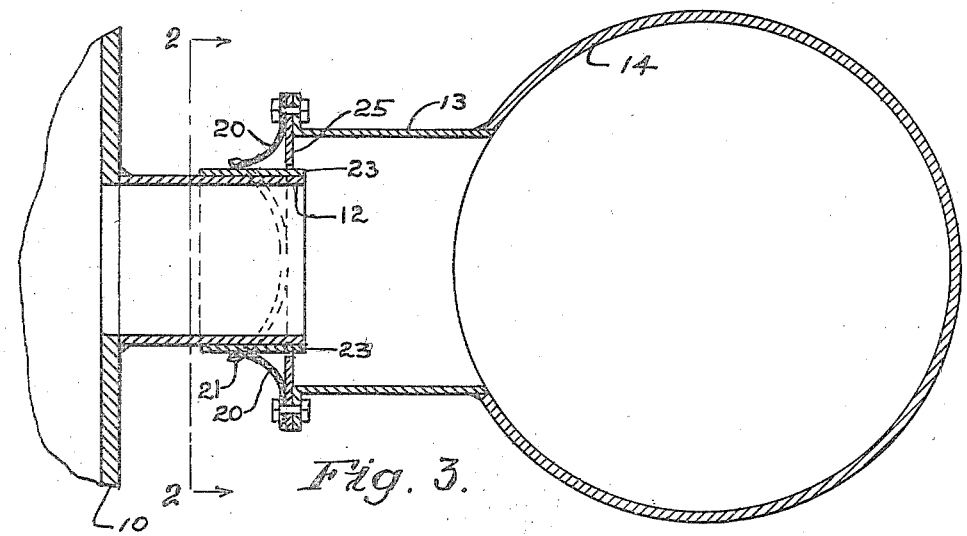
Fig. 3 is a sectional view along the lines 3—3 of Fig. 2.
Figure 4:
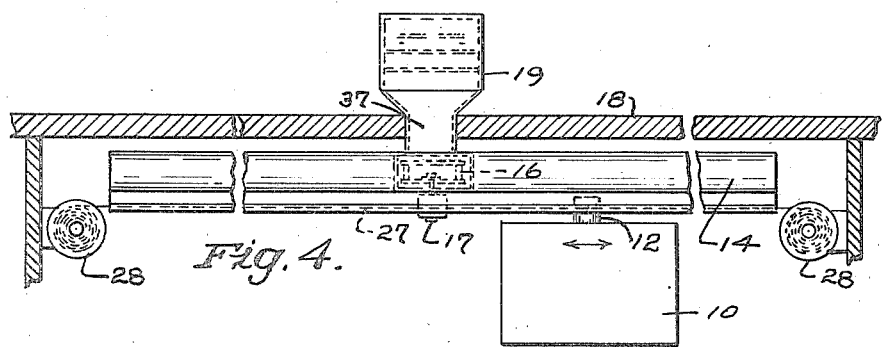
Fig. 4 is a plan view looking downwardly upon an embodiment of the invention using a movable, flexible tape for providing the air seal between the movable and stationary ducts.
Figure 5:
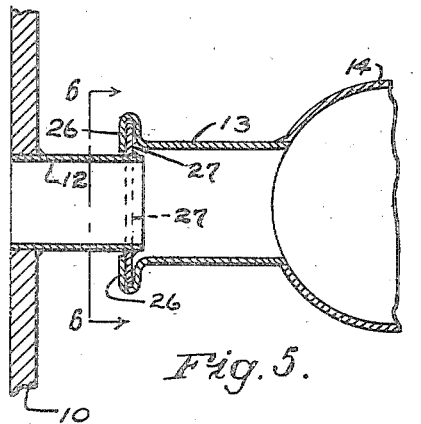
Fig. 5 is a sectional view along the lines 5—5 of Fig. 6, and illustrates the details of the connection of the flexible tape of Fig. 4 to the movable and stationary ducts.
Figure 6:
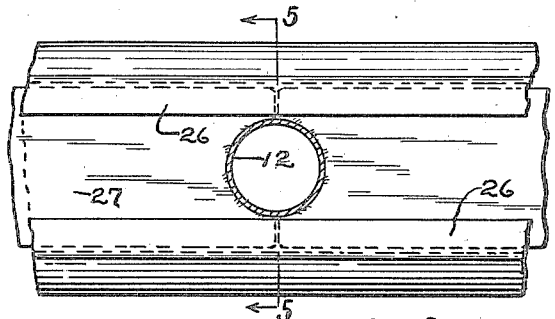
Fig. 6 is a sectional view along the lines 6—6 of Fig. 5.

For preventing leakage through the connection of the movable duct 12 with the extension 13 of the stationary duct 14, the movable seals illustrated by Figs. 2 and 3, and by Figs. 4, 5 and 6 can be used.

Referring first to Figs. 2 and 3, the slide fastener seal there illustrated will be described. The outlet end of the duct extension 13 has the outer ends of the flexible webs 20 attached thereto, the inner ends of the webs being attached to the slider channel elements 21. The sliders 22 are connected to the ring 23 which is fitted over the end of the duct 12 which connects with the duct extension 13, and extends through the perforated end wall 25 of the duct extension.

The duct 12 is movable between the channel elements 21, the slide fasteners 22 drawing the elements 21 together on each side of the duct. As the duct 12 moves with the cab 10, one slide fastener 22 is moved ahead of the duct and releases the channel elements 21 immediately in advance of the duct thus permitting its movement between the elements. The other slide fastener 22 follows up the duct 12 and draws the channel elements 21 immediately in the rear of the duct, together. The webs 20, the channel elements 21 and the slide fasteners thus provide an air seal on both sides of the duct 12 as it is moved by the cab 10.

In the embodiment illustrated by Figs. 4, 5 and 6, the ends 26 of the duct extension 13 extending around the duct 12, are bent over the upper and lower ends of the flexible metal tape 27 and form guide-ways in which same can move. The tape 27 is attached to the duct 12 as by being welded thereto around same, and is movable with the duct 12 as same is moved by the cab 10.

The ends of the tape 27 are windable on the reels 28 located at the opposite ends of the duct 14. As the cab 10 moves the duct 12, the tape 27 moves therewith forming a seal in the air outlet end of the duct extension 13. The tape winds up on one reel 28 and is unwound from the other reel depending upon direction of movement. Air from the duct 14 thus passes through the duct 12 into the cab 10 without any leakage of air around the connection of the duct 12 into the duct extension 13.

While embodiments of the invention have been described for the purpose of illustration, it should be understood that the invention is not limited to the exact apparatus and arrangements of apparatus illustrated, as modifications thereof may be suggested by those skilled in the art without departure from the essence of the invention.

What is claimed is:

1. A ventilating system for a movable enclosure, comprising a stationary duct extending alongside the path of movement of the enclosure, said duct having a longitudinally extending opening facing said enclosure, a supply duct movable with said enclosure and having one end connected to the interior thereof, means connecting the other end of said supply duct with said opening and forming a movable closure for the opening, said means including a tape movable with said supply duct and extending from opposite sides thereof parallel said opening, and including walls extending from said stationary duct at opposite sides of said opening in contact with said tape, and means for supplying air into said stationary duct.

2. A ventilating system as claimed in claim 1 in which the tape is flexible, and in which reels are provided at the opposite ends of the opening for winding up one end of, and unwinding the other end of, the tape during movement thereof.

3. A ventilating system for a movable enclosure, comprising a stationary duct extending alongside the path of movement of the enclosure, said duct having a longitudinally extending opening therein facing said enclosure, a supply duct movable with said enclosure and having one end connected to the interior thereof, means connecting the other end of said supply duct with said opening and forming a movable closure for the opening, said means including a tape around the other end of said supply duct and extending from opposite sides thereof parallel said opening and including walls extending from said stationary duct at opposite sides of said opening with guideways for the tape at their ends opposite the stationary duct, and means for supplying air into the stationary duct.

4. A ventilating system as claimed in claim 3 in which the tape is flexible, and in which reels are provided at the opposite ends of the opening for winding up one end of, and unwinding the other of, the tape during movement thereof.

HAROLD HEMMING.

REFERENCES CITED

The following references are of record in the file of this patent:

UNITED STATES PATENTS

| Number | Name | Date |
|---|---|---|
| 2,251,230 | Ragsdale | July 29, 1941 |
| 2,268,530 | Waechter | Dec. 30, 1941 |
| 2,348,455 | Daudelin | May 9, 1944 |

FOREIGN PATENTS

| Number | Country | Date |
|---|---|---|
| 19,838 | Great Britain | 1905 |
| 498,449 | Germany | Mar. 22, 1930 |